United States Patent [19]

Mahrt

[11] Patent Number: 4,601,345

[45] Date of Patent: Jul. 22, 1986

[54] MIXING AND DROP SYSTEM FOR FIRE RETARDANTS

[76] Inventor: David M. Mahrt, 2566 Christian Ave., Redding, Calif. 96002

[21] Appl. No.: 742,955

[22] Filed: Jun. 10, 1985

[51] Int. Cl.$^4$ .................. A62C 28/00; A62C 31/30
[52] U.S. Cl. ........................................ 169/53; 169/14; 239/171
[58] Field of Search .................. 169/14, 15, 53; 239/171, 144; 244/136

[56] References Cited

U.S. PATENT DOCUMENTS

| | | |
|---|---|---|
| 3,216,617 | 11/1965 | Blomgren, Sr. et al. ....... 239/171 X |
| 3,661,211 | 5/1972 | Powers ..................... 239/171 X |
| 3,710,868 | 1/1973 | Chadwick ..................... 169/53 |
| 3,714,987 | 2/1973 | Mattson ..................... 169/15 X |
| 3,754,601 | 8/1973 | Linkewich ..................... 169/53 X |
| 4,172,499 | 10/1979 | Richardson et al. ............. 169/14 X |

Primary Examiner—Jeffrey V. Nase
Assistant Examiner—L. E. Williams
Attorney, Agent, or Firm—Leonard D. Schappert

[57] ABSTRACT

A fire retardant mixing and drop system for use with aircraft including a reservoir for holding fire retardant concentrate, a bucket, an injection and agitation or mixing system, and a dumping system for dumping fire retardant on a fire.

2 Claims, 4 Drawing Figures

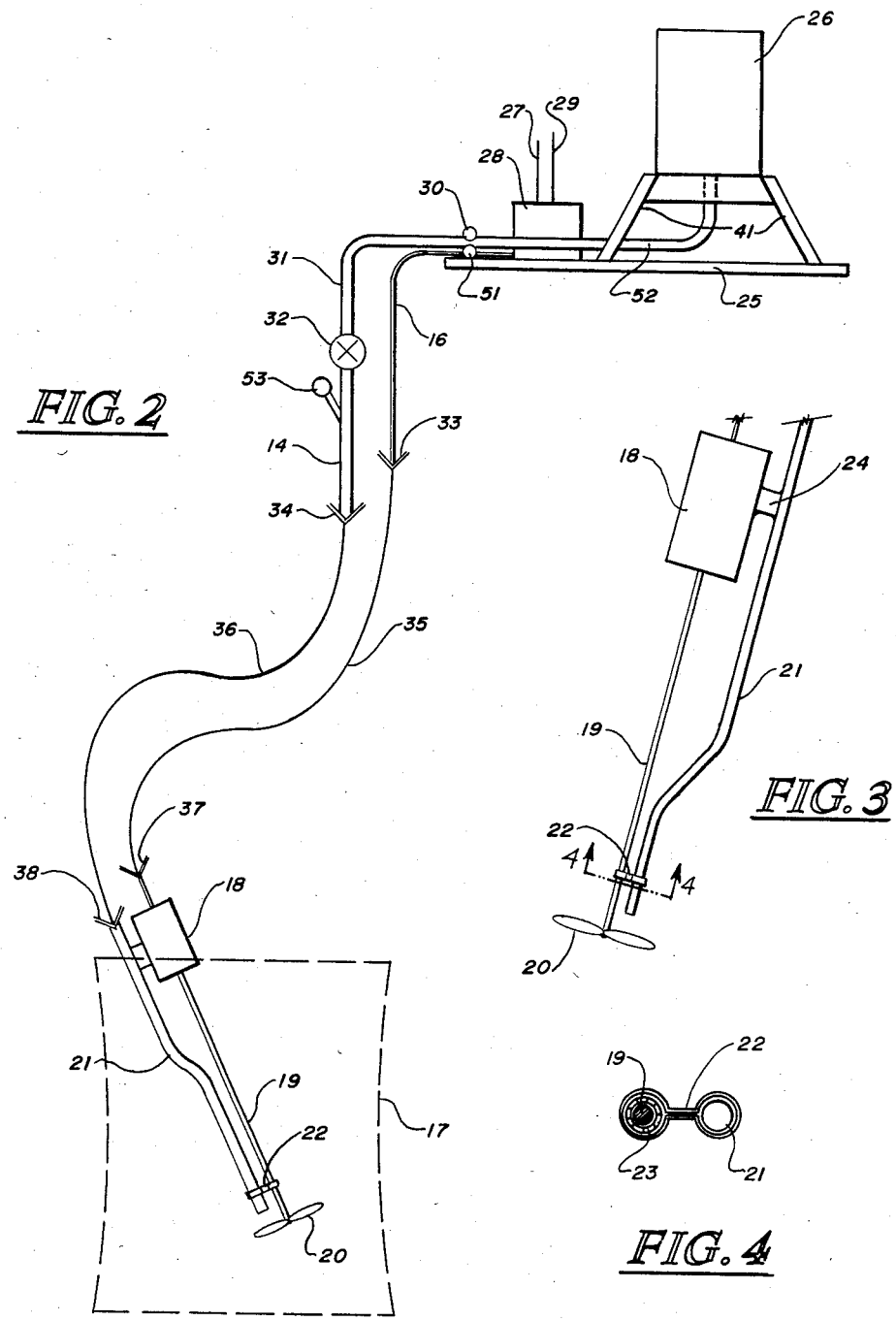

MIXING AND DROP SYSTEM FOR FIRE RETARDANTS

FIELD OF THE INVENTION

The present invention relates generally to devices utilized for delivering fire retardant to a land fire, such as a forest or brush fire, and more specifically to a mixing and drop system for fire retardant which includes means for carrying a sufficient amount of fire retardant concentrate and mixing apparatus to mix it with water so that several loads of fire retardant can be mixed at or near the site of the fire so long as a water source is available.

DESCRIPTION OF THE PRIOR ART

In order for a fire to continue to burn, three components must be present: heat, fuel and oxygen. Standard fire fighting practice for any area and for any type of fire includes removing one of these required components. In recent years, aircraft have been utilized to deliver fire retardant material to forest and brush fires, thereby aiding in the extinguishing thereof. In its earliest form, such use of aircraft included the dropping of large amounts of water on forest and brush fires to aid in control. However, such use was minimally effective because, when the water was dropped from the aircraft, it dispersed and formed a fine spray which was easily neutralized by evaporation resulting from the heat and convection currents present above a fire. In many cases where extreme heat was generated, the water would all evaporate prior to reaching the fire itself. This system was improved through the mixing of short-term fire retardant with the water to be dropped on a fire. Such short-term fire retardant retards the rate of evaporation of the water and, when it hits the forest or brush areas on which it is being dropped, it coats the trees or brush to temporarily reduce the amount of fuel available to the fire, thereby lowering the temperature and removing a portion of the fuel for a period of time. More recently, short-term fire retardant has been largely replaced by long-term fire retardant such as ammonium sulfate and a sticking agent mixed with relatively small amounts of water to form a thick slurry. This change in usage resulted primarily from the fact that, in many cases, sufficiently large lakes were not available to enable large aircraft used in dropping fire retardant to take on additional water in situ so as to be effectively utilizable with short-term retardant. With the entry of helicopters into the fighting of forest and brush fires, it has become possible to use smaller water sources for purposes of collecting water to mix with fire retardant concentrate; this makes the use of short-term fire retardant feasible. However, no effective system for mixing short-term fire retardant in a bucket with water from the helicopter at a remote location has been available. The present invention seeks to remedy this situation.

SUMMARY OF THE INVENTION

The present invention comprises a mixing and drop system for use with fire retardants. The system is composed of two units: an onboard unit which includes a reservoir for holding the fire retardant concentrate, and a second unit comprising an injection and agitation system for use in mixing the fire retardant concentrate with water in a bucket.

The onboard unit includes a reservoir and a chemical pump mounted on a palette-style base capable of being strapped onto the floor of the aircraft. Electrical and chemical lines run from the onboard unit and are attached by quick couplings to a chemical line and an electrical line extending to a bucket and attaching by quick couplings to an agitation system. The second unit is the injection and agitation system which includes an electric motor or other appropriate means driving a shaft and a propeller to mix and circulate the fire retardant concentrate with water in a bucket. The injection and agitation system mounts on a bucket on a support frame or on the side of the bucket. In the operation of the invention, the reservoir on board the aircraft is filled with fire retardant concentrate. At a fire site, after a load of water is picked up in the bucket, the injection and agitation system is turned on for about 10 seconds to circulate the water in the bucket. The chemical pump is then turned on for a sufficient time to inject an amount of fire retardant concentrate necessary to yield effective fire retardant when mixed with the amount of water in the bucket. When the fire retardant concentrate reaches the spinning propeller, the mixing of the water and the concentrate takes place instantly. Mixing is complete after approximately 20 seconds, and the injection and agitation system is then turned off, the fire retardant concentrate having been thoroughly mixed and circulated.

One of the objects of the present invention is to provide a mixing system for fire retardants for use with helicopters which enables a helicopter to pick up loads of water and to mix the retardant with the water in a hanging bucket during flight.

Another object of the present invention is to provide a mixing and drop system for fire retardants for use with a helicopter which is relatively inexpensive to produce, while at the same time being more efficient than the systems heretofore existing.

A further object of the present invention is to provide a mixing and drop system for fire retardants including means for mixing fire retardant with water in a bucket, and including means for quickly disconnecting the bucket and apparatus from the aircraft.

The foregoing objects, as well as other objects and benefits of the present invention, are made more apparent by the descriptions and claims which follow.

BRIEF DESCRIPTION OF THE DRAWINGS

FIG. 2 is an operational view showing the construction of the helicopter mixing and drop system for fire retardants.

FIG. 3 is an enlarged view of the injection and agitation system utilized in mixing fire retardant with water in the bucket.

FIG. 4 is a cross-sectional view taken along lines 4—4 of FIG. 3.

DESCRIPTION OF THE PREFERRED EMBODIMENT

Figure 1:
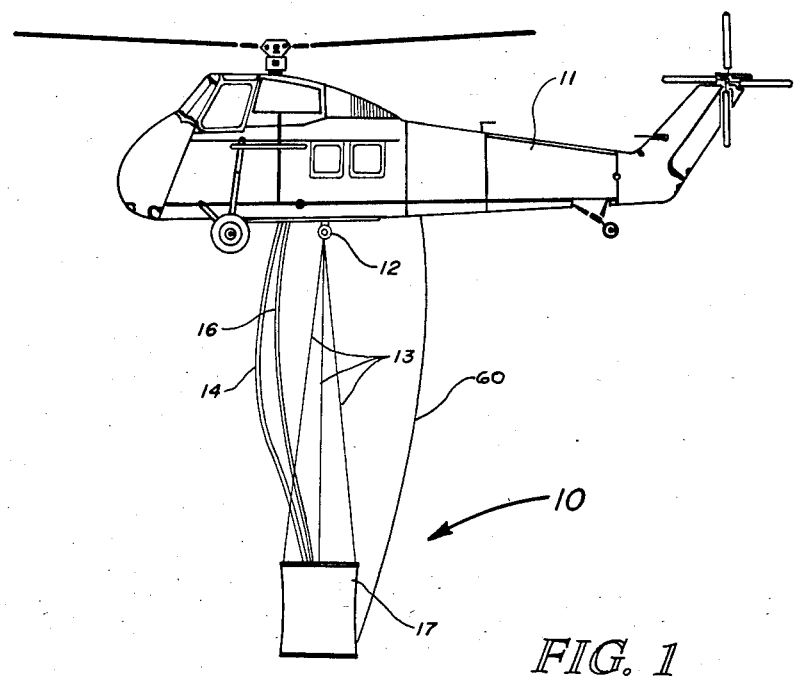
FIG. 1 is a side view showing a helicopter with a water bucket designed to fight fires.

The present invention consists of a helicopter mixing and drop system for fire retardants. In FIG. 1, the helicopter 11 is shown with bucket 17, which holds water and/or mixed fire retardant, attached thereto by lines 13 and connector 12. FIG. 1 further shows electrical line 35 and chemical line 36 extending between helicopter 11 and bucket 17. A dump line 60 is provided to lift one side of bucket 17 in order to dump mixed fire retardant.

FIGS. 2 and 3 are operational views of the mixing and drop system showing the construction of the system. The mixing and drop system includes a reservoir 26 held in position by a bracket 41 on platform 25. Reservoir 26 is designed to hold an amount of fire retardant concentrate which is sufficient to make several buckets of fire retardant when mixed with water in bucket 17. Electrical box 28 is also positioned on platform 25, and has electrical lines 27 and 29 which attach to the electrical system of helicopter 11 to deliver power to pump 30 and mixing motor 18, thereby facilitating operation of the mixing and drop system. The fire retardant concentrate in reservoir 26 is routed through chemical line 52 to pump 30 to chemical line 31 through manual shutoff valve 32, through chemical lines 14 and 36 and 21 into bucket 17. Chemical line 36 is attached at one end to chemical line 14 by chemical line quick coupling 34, and at the other end to chemical line 21 by chemical line quick coupling 38, so that bucket 17 can be removed when chemical line 36 is detached from either of chemical lines 14 or 21. Manual shutoff of valve 32 is provided to override pump 30 and to allow manual metering of fire retardant concentrate through chemical line 14. Pump 30 is activated by switch 51, which is attached to electrical line 16 coming from electrical box 28. Electrical power is routed through electrical line 16 and electrical line 35 to mixing motor 18. Electrical line 35 attaches at one end to electrical line 16 by quick coupling 33, and at the other end to mixing motor 18 by electrical quick coupling 37, thereby facilitating quick and easy removal of bucket 17 from helicopter 11 and of electrical line 35 from either mixing motor 18 or electrical line 16. A flow meter 53 is provided to detect the amount of fire retardant concentrate passing through chemical line 14, so that the desired amount of fire retardant concentrate may be metered into the water in bucket 17. As the fire retardant concentrate comes through chemical line 21 and exits into bucket 17, propeller 20, powered by mixing motor 18 through shaft 19, turns and mixes the fire retardant concentrate with the water, resulting in effective fire retardant.

FIG. 3 shows more specifically the construction of the mixing system utilized to mix the fire retardant concentrate with water in bucket 17. Mixing motor 18 is attached to chemical line 21 by bracket 24, and shaft 19, which operates propeller 20, is held in position with respect to chemical line 21 by bracket 22. While any other adequate mixing system could be utilized in mixing the fire retardant concentrate with water, the unit just described performs adequately.

In FIG. 4 a cross-sectional view of bracket 21, chemical line 21 and shaft 19 is shown. As shown in FIG. 4, a bearing 50 is provided so that shaft 19 turns freely.

OPERATION

During operation of the helicopter mixing and drop system for fire retardants, reservoir 26 is filled with the fire retardant concentrate necessary to make effective fire retardant when mixed with water. There is normally a water source at or near the site of a fire. However, because large aircraft are unable to access small water sources, helicopters are very useful in fighting fires. Utilizing the present invention, a helicopter can access substantially any small water source, such as a stream or small pond, to fill bucket 17, either by tilting bucket 17 in a water source and letting it fill, skimming across a water source, thus filling the bucket 17 more quickly, or, in the case of a small stream or river, by utilizing an auxiliary pump to fill bucket 17 from the small stream or river. Then, during flight, the fire retardant concentrate from reservoir 26 can be routed to bucket 17 and mixed with the water therein, thereby increasing the speed and effectiveness of the helicopter fire-fighting unit in fighting fires. Because of the small amount of fire retardant concentrate necessary to form effective fire retardant when mixed with water, the helicopter can store a sufficient amount of fire retardant concentrate to enable the helicopter to operate effectively as a fire-fighting unit, for several hours in many instances, without returning to reload fire retardant concentrate. The ratio of fire retardant concentrate to water required to formulate effective fire retardant is generally in the area of one quart of fire retardant concentrate to 100 gallons of water. A water bucket 17 generally holds about 400 gallons of water, and reservoir 26 is generally capable of holding 15 or more gallons of fire retardant concentrate, thereby allowing for the production of 15 buckets of 400 gallons each of fire retardant.

While the foregoing description of the invention has shown a preferred embodiment using specific terms, such description is presented for illustrative purposes only. It is applicant's intention that changes and variations may be made without departure from the spirit or scope of the following claims, and this disclosure is not intended to limit applicant's protection in any way.

I claim:

1. A mixing and drop system for use with liquid fire retardant concentrate with helicopters in fighting fires, comprising:
   a hanging bucket attached to said helicopter by attaching means so that said bucket hangs down below said helicopter;
   a reservoir for holding said liquid fire retardant concentrate;
   a chemical line for conveying said liquid fire retardant concentrate from said reservoir to said hanging bucket;
   pumping means for pumping said liquid fire retardant concentrate from said reservoir through said chemical line to said hanging bucket;
   metering means for controlling the amount of said liquid fire retardant concentrate pumped from said reservoir to said hanging bucket;
   mechanical mixing means consisting substantially of a propeller attached to an electric motor, positioned substantially inside of said bucket for agitating and mixing said liquid fire retardant concentrate from said reservoir with water inside said bucket to create an effective mixture of fire retardant, and
   dumping means, operable from said helicopter, for dumping said effective mixture of fire retardant from said bucket onto a fire.

2. The invention of claim 1, including quick chemical line disconnect means for quickly disconnecting said chemical line between said reservoir and said bucket.

* * * * *